(12) United States Patent
Eliáš et al.

(10) Patent No.: US 10,002,178 B2
(45) Date of Patent: Jun. 19, 2018

(54) STORAGE CLUSTER DATA SHIFTING

(71) Applicant: Red Hat, Inc., Raleigh, NC (US)

(72) Inventors: Filip Eliáš, Brno (CZ); Filip Nguyen, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 668 days.

(21) Appl. No.: 14/294,231

(22) Filed: Jun. 3, 2014

(65) Prior Publication Data

US 2015/0347559 A1 Dec. 3, 2015

(51) Int. Cl.
*G06F 17/30* (2006.01)

(52) U.S. Cl.
CPC .. *G06F 17/30598* (2013.01); *G06F 17/30584* (2013.01); *G06F 17/30958* (2013.01)

(58) Field of Classification Search
CPC ................................................ G06F 17/30584
See application file for complete search history.

(56) References Cited

U.S. PATENT DOCUMENTS

| | | | |
|---|---|---|---|
| 5,640,555 A * | 6/1997 | Kleewein | G06F 17/30575 395/610 |
| 6,446,219 B2 | 9/2002 | Slaughter et al. | |
| 8,037,185 B2 | 10/2011 | Steinder et al. | |
| 8,296,419 B1 | 10/2012 | Khanna et al. | |
| 8,479,037 B1 | 7/2013 | Chatterjee et al. | |
| 8,645,429 B1 * | 2/2014 | Bik | G06F 17/30958 707/797 |
| 2010/0161671 A1 * | 6/2010 | Charnine | G06F 17/3071 707/797 |
| 2012/0158799 A1 * | 6/2012 | Morsi | G06F 17/30289 707/812 |
| 2012/0233486 A1 | 9/2012 | Phull et al. | |
| 2012/0296883 A1 | 11/2012 | Ganesh et al. | |
| 2012/0331249 A1 | 12/2012 | Benjamin et al. | |
| 2013/0219036 A1 | 8/2013 | Gusev et al. | |
| 2014/0244642 A1 * | 8/2014 | Yogev | G06F 17/30584 707/737 |
| 2015/0149509 A1 * | 5/2015 | Leu | G06F 17/30575 707/803 |
| 2015/0234895 A1 * | 8/2015 | Erdogan | G06F 17/30466 707/714 |

* cited by examiner

*Primary Examiner* — Marc S Somers
(74) *Attorney, Agent, or Firm* — Haynes and Boone, LLP

(57) ABSTRACT

A method performed by a computing system includes creating a graph, wherein nodes of the graph represent data objects of a data storage cluster, wherein edges of the graph represent joins between data objects represented by both nodes of respective edges, wherein node values of the nodes and weights of the edges are based on statistics related to use of the data objects. The method further includes assigning a first subset of the data objects to a relational database storage node within the data storage cluster, the first subset of data objects being represented by nodes within a cluster of the graph, and assigning a second subset of the data objects to a non-relational database storage node within the data storage cluster, the second subset of data objects being represented by nodes within the graph that are not part of a cluster.

18 Claims, 10 Drawing Sheets

STORAGE CLUSTER DATA SHIFTING

BACKGROUND

The present disclosure relates generally to a data storage management, and more particularly to methods and systems for shifting data within a data storage cluster.

Various types of data storage systems are available for different kinds of data. For example, relational databases are used to store data in the form of tables. Tables include a set of columns corresponding to attributes. Each row corresponds to a data set that represents a single item that may have one or more of the attributes associated with the columns. Data objects in such a format are often stored and managed by a relational database management system. Such a system handles Structured Query Language (SQL) requests. SQL is a type of language used to manage data objects in the form of tables.

Data objects such as tables are often stored in data storage clusters. A data storage cluster includes several computing devices having data storage capability. Each device is referred to as a node. The nodes are all connected to a node manager. The node manager may be used to provide service to a client system by accessing different sets of data from multiple nodes for presentation to the client system.

Data storage clusters typically include nodes of one type. For example, a data storage cluster may include several relational database storage nodes that store and format data for use with a relational database. A different type of data storage cluster may include non-relational database storage nodes that do not store data in a relational database format. For example, a non-relational database storage node may be a file database that stores data files. It is desirable that data stored within data storage clusters is well managed so as to provide efficient access and reliability.

SUMMARY

According to one example, a method performed by a computing system includes creating a graph, wherein nodes of the graph represent data objects of a data storage cluster, wherein edges of the graph represent joins between data objects represented by both nodes of respective edges, wherein node values of the nodes and weights of the edges are based on statistics related to use of the data objects. The method further includes assigning a first subset of the data objects to a relational database storage node within the data storage cluster, the first subset of data objects being represented by nodes within a cluster of the graph. The method further includes assigning a second subset of the data objects to a non-relational database storage node within the data storage cluster, the second subset of data objects being represented by stand-alone nodes within the graph.

According to one example, a method performed by a computing system includes collecting statistics related to a number of times data objects within a hybrid data storage cluster have been accessed and how many times join operations have been applied to the data objects, creating a graph, wherein nodes of the graph represent data objects of the hybrid data storage cluster, wherein edges of the graph represent joins between data objects associated with both nodes of respective edges, wherein values of the nodes and weights of the edges are based on statistics related to use of the data objects of the hybrid data storage cluster. The method further includes assigning a first subset of the data objects to a relational database storage node within the data storage cluster, the first subset of data objects being represented by nodes within a cluster of the graph. The method further includes assigning a second subset of the data objects to a non-relational database storage node within the data storage cluster, the second subset of data objects being represented by stand-alone nodes within the graph.

According to one example, a computing system includes a processor and a memory comprising machine readable instructions that when executed by the processor, cause the system to create a graph, wherein nodes of the graph represent data objects of a data storage cluster, wherein edges of the graph represent joins between data objects associated with both nodes of respective edges, wherein values of the nodes and weights of the edges are based on statistics related to use of the data objects of the data storage cluster. The machine readable instructions are further to cause the system to assign a first subset of the data objects to a relational database storage node within the data storage cluster, the first subset of data objects being represented by nodes within a cluster of the graph. The machine readable instructions are further to cause the system to assign a second subset of the data objects to a non-relational database storage node within the data storage cluster, the second subset of data objects being represented by stand-alone nodes within the graph. The node values of the nodes are based on a number of times a table associated with the respective node has been accessed, and wherein the weights of the edges are based on a number of times a join operation has been requested for two data objects associated with two nodes connected to the respective edge.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As described above, it is desirable that data stored within data storage clusters is well managed so as to provide efficient access and reliability. According to principles described herein, data is periodically shifted across a hybrid storage cluster that includes both relational and non-relational database storage nodes. This is done by creating a graph wherein nodes of the graph represent data objects stored within the cluster. The node values of the nodes in the graph and the weights of the edges between the nodes are based on statistics related to use of the data objects within the storage cluster. As will be described in further detail below, data is shifted so that data objects that regularly have relational database operations, such as join requests, performed thereon are shifted to relational database storage nodes within the cluster. And, data objects that do not have relational database operations performed thereon will tend to be shifted to non-relational database storage nodes within the cluster. This allows for more efficient use of the data stored within the storage cluster.

Figure 1:
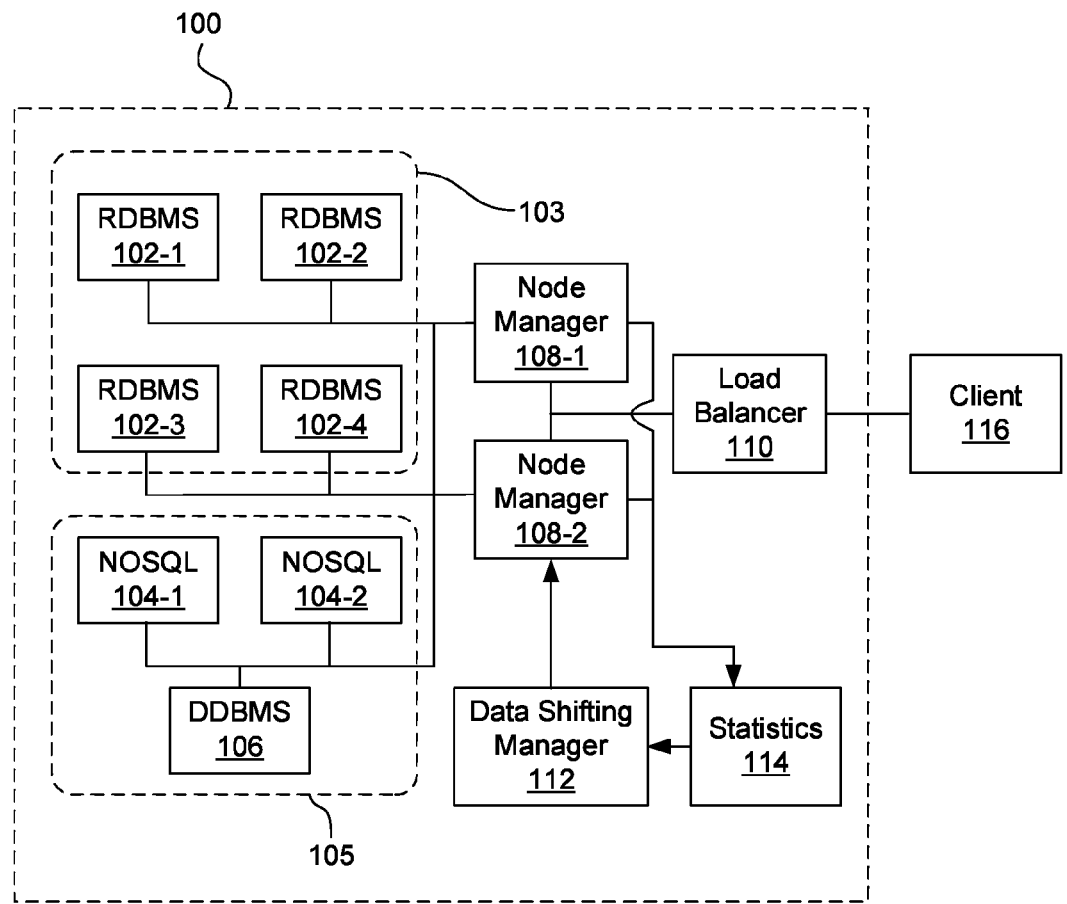
FIG. 1 is a diagram showing an illustrative hybrid data storage cluster, according to one example of principles described herein.

FIG. 1 is a diagram showing an illustrative hybrid data storage cluster 100. According to the present example, the hybrid data storage cluster 100 includes different types of data storage nodes. For example, the hybrid data storage cluster 100 includes relational database storage nodes 103 and non-relational database storage nodes 105. In some cases, different data storage nodes may be operated or owned by different entities. The hybrid data storage cluster 100 includes node managers 108, a load balancer 110, and a data shifting manager 112.

According to the present example, the hybrid data storage cluster 100 includes relational database storage nodes 103. Relational database storage nodes 103 generally store data in a tabular format as described above. Specifically, the data stored on relational database storage nodes includes tables that have columns representing attributes, and rows representing data items. Each of the different relational database storage nodes 103 may include a relational database management system.

The hybrid data storage cluster 100 also includes non-relational database storage nodes 105 that do not store data in a tabular format. For example, the non-relational database storage nodes 105 may include NoSQL nodes 104 and distributed database storage nodes 106. The non-relational database storage nodes store data in a format other than the tabular format used by relational database storage nodes 103. The non-relational database storage nodes 105 may include their own management systems.

The different relational database managements systems on the different relational database storage nodes 103 may have different capabilities. Additionally, the different non-relational database management systems on different non-relational database storage nodes 105 may have different capabilities. The node managers 108 maintain a list of the capabilities of management systems for each type of node 103, 105 in the hybrid data storage cluster 100.

According to the present example, the hybrid cluster is designed to provide data to a client system 116 on demand. For example, a client system 116 may request a specific piece of data that is stored by the hybrid data storage cluster 100. This may be done, for example, with an SQL request. Such a request is received by a load balancer 110. The load balancer decides which of the node managers 108 should handle the request. For example, if node manager 108-1 is busy and node manager 108-2 is not busy, then the load balancer can assign the request from the client system 116 to node manager 108-2

The node managers 108 coordinate data from the various database storage nodes 102, 104, 106. In some examples, the node managers 108 include a federation engine such as Teiid. The federation engine allows applications of the client systems to access data located in different databases in a uniform manner. For example, different data storage nodes may have different capabilities. Some databases have the ability to perform join operations, group operations, etc. while other databases may not have such capabilities. The federation engine may thus perform requested operations on behalf of a storage node that is not capable of performing such operations. For example, if a node manager 108 receives a request from a client system to perform an ORDER BY operation on a particular set of data, and that data is stored on a data storage node that does not have the capability to execute the ORDER BY operation, then the federation engine of the node manager may query the data storage node for the data and perform the ORDER BY operation on the data itself. The node manager 108 can then present the result of the ORDER BY operation to the client system 116.

Additionally, the node managers may receive SQL requests from a client system 116 through the load balancer 110. The node manager 108 then determines where the data associated with the request is stored. Specifically, the requested data may be stored across multiple different storage nodes. Thus, the node manager 108 requests that data from the multiple storage nodes. Additionally, the node manager 108 finishes processing the data into the requested format if the data storage node from which the data was obtained is unable to do so. If a node manager 108 becomes overloaded with such processing, it may pass some processing tasks to a different node manager 108.

The node managers 108 also collect statistics 114 associated with the hybrid data storage cluster 100. For example, the node managers keep track of the location of tables, the number of rows in the tables, the number of accesses each of the tables, the number of SQL JOIN operations applied to multiple tables, and the number of and type of SQL clauses used to query the tables.

The statistics 114 are used by the data shifting manager 112 to redistribute data across the relational storage nodes 103 and the non-relational storage nodes 105. The data shifting manager distributes data such that requests made for the data can be accessed in a more efficient manner. In general, tables that have not been joined with other tables end to be placed in the non-relational database storage nodes 105. Tables that are frequently joined together tend to be placed on the same relational database storage node. A detailed description of the mechanism for shifting data will be provided below.

Figure 2:
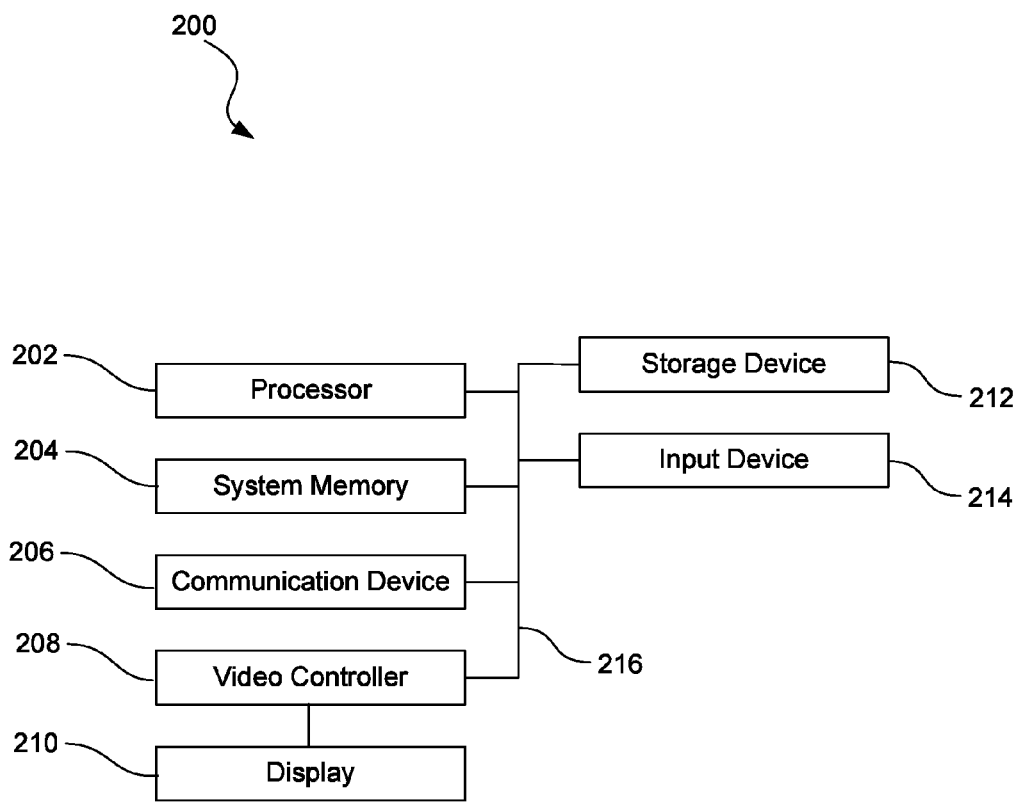
FIG. 2 is a diagram showing an illustrative computing system that may perform hybrid cluster data shifting, according to one example of principles described herein.

FIG. 2 is a diagram showing an illustrative computing system 200 that may be used to perform data shifting on a hybrid storage cluster. According to the present example, the computing system 200 includes a processor 202, an input device 214, a storage device 212, a video controller 208, a system memory 204, a display 210, and a communication device 206, all of which are interconnected by one or more buses 216.

In some examples, the storage device 212 may include a floppy drive, hard drive, CD-ROM, optical drive, any other form of storage device and/or any combination thereof. In several exemplary embodiments, the storage device 212 may include, and/or be capable of receiving, a floppy disk, CD-ROM, DVD-ROM, or any other form of computer readable medium that may contain executable instructions. In one example, the computer readable medium is a non-transitory tangible media.

In some examples, the communication device 206 may include a modem, network card, or any other device to enable the computing system 200 to communicate with other computing devices. In some examples, any computing device represents a plurality of interconnected (whether by intranet or Internet) computer systems, including without limitation, personal computers, mainframes, PDAs, smartphones and cell phones.

In some examples, a computer system typically includes at least hardware capable of executing machine readable instructions, as well as the software for executing acts (typically machine-readable instructions) that produce a desired result. In some examples, a computer system may include hybrids of hardware and software, as well as computer sub-systems.

In some examples, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In some examples, hardware may include any physical device that is capable of storing machine-readable instructions, such as memory or other data storage devices. In some examples, other forms of hardware include hardware sub-systems, including transfer devices such as modems, modem cards, ports, and port cards, for example.

In some examples, software includes any machine code stored in any memory medium, such as RAM or ROM, and machine code stored on other devices (such as floppy disks, flash memory, or a CD ROM, for example). In some examples, software may include source or object code. In several exemplary embodiments, software encompasses any set of instructions capable of being executed on a computing device such as, for example, on a client machine or server.

In some examples, combinations of software and hardware could also be used for providing enhanced functionality and performance for certain embodiments of the present disclosure. In some examples, software functions may be directly manufactured into a silicon chip. Accordingly, it should be understood that combinations of hardware and software are also included within the definition of a computer system and are thus envisioned by the present disclosure as possible equivalent structures and equivalent methods.

In some examples, computer readable mediums include, for example, passive data storage, such as a random access memory (RAM) as well as semi-permanent data storage such as a compact disk read only memory (CD-ROM). One or more exemplary embodiments of the present disclosure may be embodied in the RAM of a computer to transform a standard computer into a new specific computing machine. In some examples, data structures are defined organizations of data that may enable an embodiment of the present disclosure. In an exemplary embodiment, a data structure may provide an organization of data, or an organization of executable code.

In some examples, a network and/or one or more portions thereof, may be designed to work on any specific architecture. In some examples, one or more portions of the network may be executed on a single computer, local area networks, client-server networks, wide area networks, internets, hand-held and other portable and wireless devices and networks.

In some examples, a database may be any standard or proprietary database software, such as Oracle, Microsoft Access, SyBase, or DBase II, for example. The database may have fields, records, data, and other database elements that may be associated through database specific software. In several exemplary embodiments, data may be mapped. In some examples, mapping is the process of associating one data entry with another data entry. In an exemplary embodiment, the data contained in the location of a character file can be mapped to a field in a second table. In some examples, the physical location of the database is not limiting, and the database may be distributed. In some examples, the database may exist remotely from the server, and run on a separate platform. In some examples, the database may be accessible across the Internet. In several exemplary embodiments, more than one database may be implemented.

In some examples, a computer program, such as a plurality of instructions stored on a computer readable medium, such as the computer readable medium, the system memory 204, and/or any combination thereof, may be executed by a processor 202 to cause the processor 202 to carry out or implement in whole or in part the operation of the system 200, one or more of the methods. In some examples, such a processor 202 may execute the plurality of instructions in connection with a virtual computer system.

The computing system 200 may perform the function of any of the components described in FIG. 1. For example, the computing system 200 may be a client device 116. The computing system may be a node manager 108 or a data shifting manager 112. The computing system 200 may be a relational database storage node 103 or a non-relational database storage node 105. Additionally, the computing system 200 may perform the processes that will be described below.

Figure 3A:
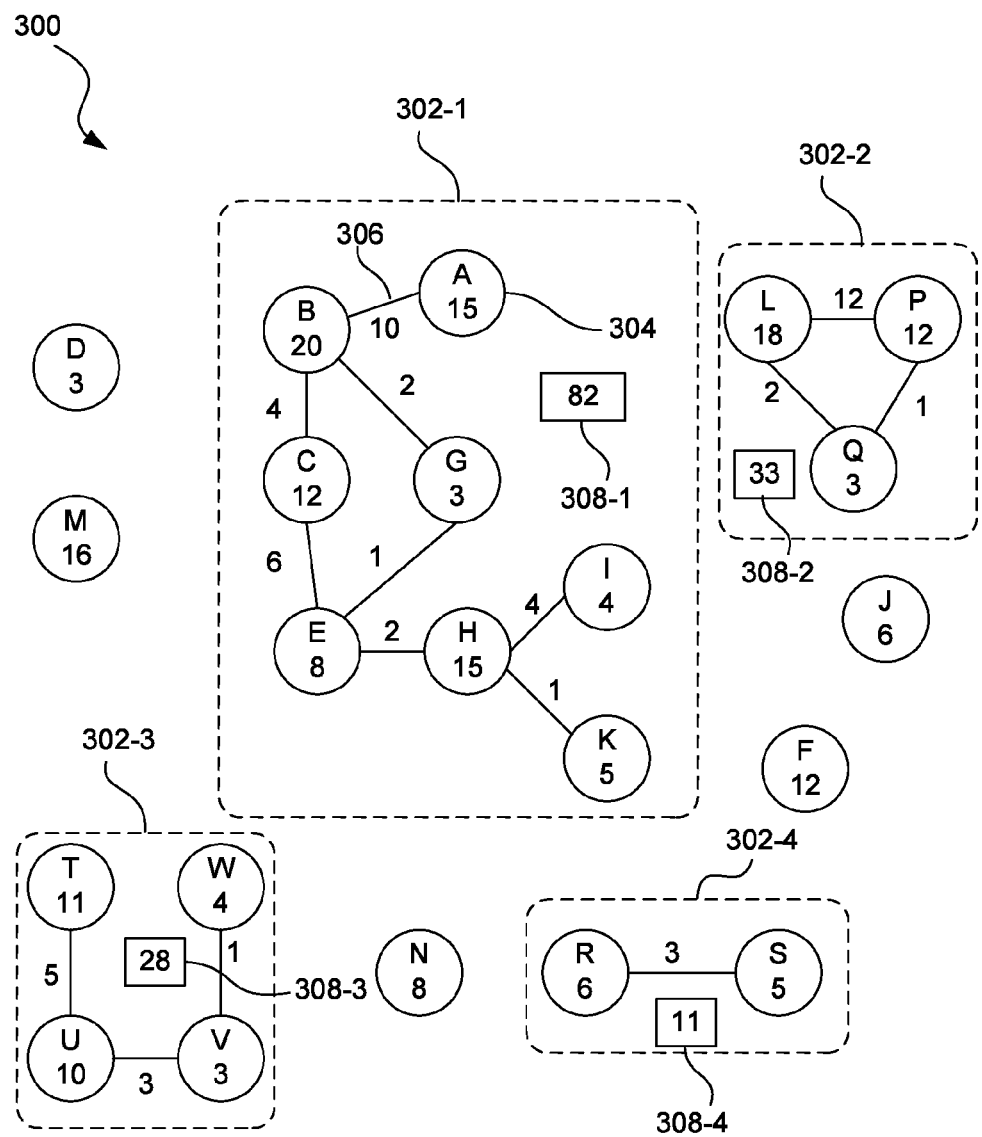
FIGS. 3A and 3B are diagrams showing an illustrative graph representing data stored within a hybrid data storage cluster, according to one example of principles described herein.

FIG. 3A is a diagram showing an illustrative graph 300 representing data stored within a hybrid data storage cluster. The graph 300 is used to represent the data stored within a hybrid cluster. The graph is used to determine how to shift data between the multiple storage nodes of the hybrid data cluster. The graph 300 uses statistics that were collected for the data objects stored within the hybrid cluster. In one example, statistics are collected for a set period, such as a day, a week, a month, etc. At the end of each period, the data shifting manager uses the following process to determine how to shift data stored within the hybrid data cluster.

In the present example, each node (304-A to 304-W) within the graph represents a data object that is stored within the hybrid data cluster. One example of a data object is a table. Each of the nodes 304 within the graph 300 is assigned a value, which will be referred to as a node value. For example, node 304-A has a node value of 15. The node value is based on statistics associated with the data object represented by the node 304. In one example, the node value corresponds to the number of times that data object has been requested by a client device. In one example, the node value may be weighted based on the size of the data object. For example, if the data object is a table, then the node value may be represented by (Number of times requested)*a+ (Number of rows)*b, where a+b=1.

In some examples, if a data object is too large, it may be assigned to the distributed database storage node 106. For example, there may be a threshold size set by an administrator, any data objects that become larger than this threshold are put onto the distributed database. Thus, such data objects are not represented by a node in the graph 300. Rather, the nodes 304 represent data objects below the threshold size.

The nodes 304 are connected to each other through edges 306. Edges will be referred to by the nodes to which they connect. For example, the edge between node 304-A and node 304-B will be referred to as edge 306-AB. The edges 306 may also be assigned a weight. An edge between two nodes indicates that a client device has requested at least one JOIN operation between the data objects represented by those nodes. The weight of the edge indicates the number of times a JOIN operation has been requested. For example, the edge 306 between node 304-A and node 304-B has a weight of 10. This means that a client device has requested a JOIN operation between the data object represented by node A and the data object represented by node 304-B 10 times.

When creating a graph as described above, some nodes are in clusters 302 while some nodes stand alone. In the present example, nodes 304-D, 304-M, 304-N, 304-F, and 304-J stand alone. This means that no clients have requested a join operation on the data objects associated with these nodes. The remaining nodes 304 have been put into clusters. Cluster 302-1 includes nodes 304-A, 304-B, 304-C, 304-E, 304-G, 304-H, 304-I, and 304-K. Cluster 302-2 includes nodes 304-L, 304-P, and 304-Q. Cluster 302-3 includes nodes 304-T, 304-U, 304-V, and 304-W. Cluster 302-4 includes nodes 304-R and 304-S. Each cluster 302 is given a cluster value 308 that corresponds to the sum of all node values within the cluster. Cluster 302-1 has cluster value 308-1, cluster 302-2 has cluster value 308-2, cluster 302-3 has cluster value 308-3, and cluster 302-4 has cluster value 308-4. Use of the cluster value 308 will be described in further detail below.

The nodes 304 belonging to clusters, which will be referred to as a first subset of nodes, are treated differently than the nodes 304 that are not within a cluster. A second subset of nodes 304, the nodes not within a cluster, will be referred to as stand-alone nodes.

Figure 3B:
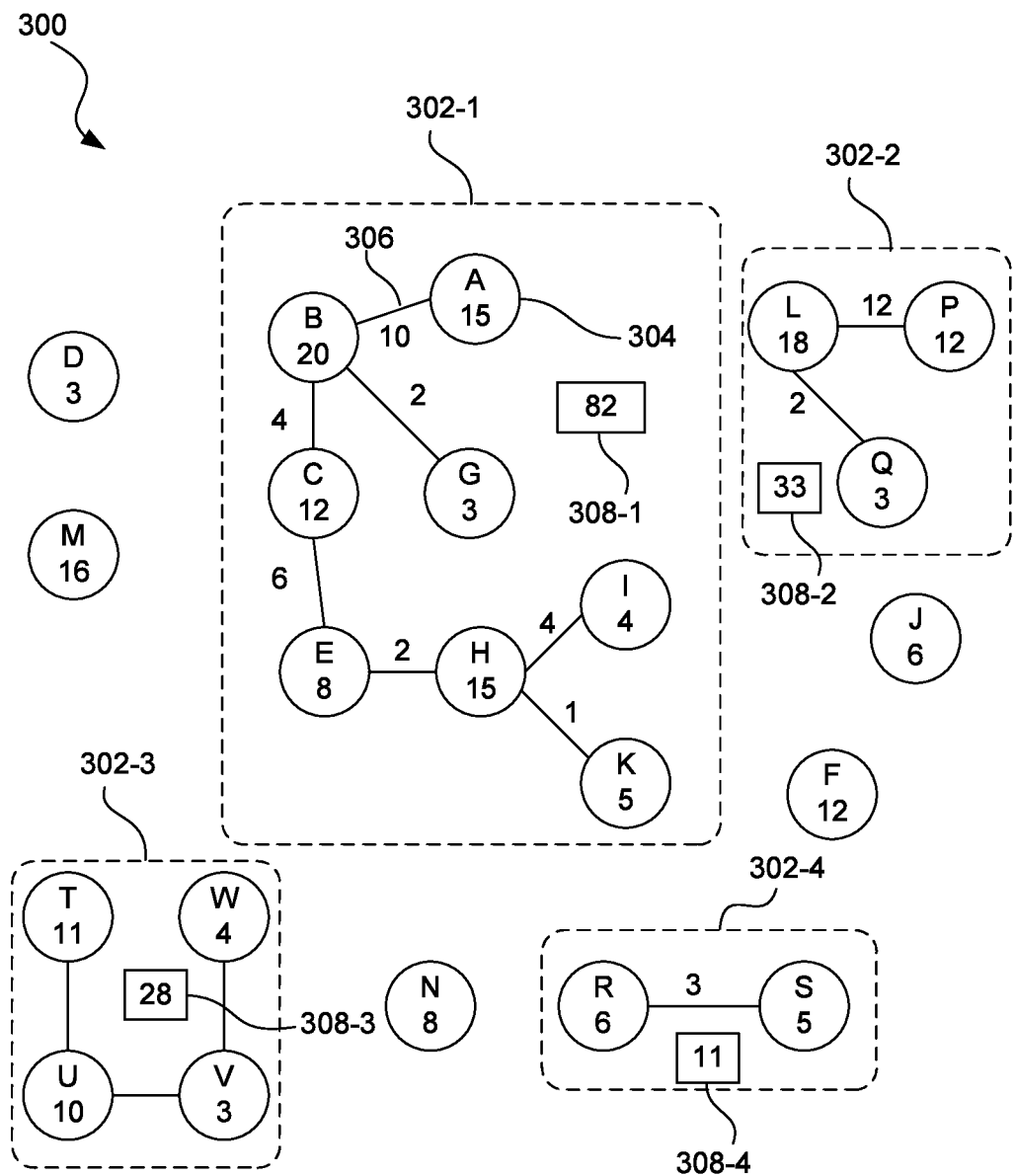

Regarding the first sub-set of nodes, or nodes within a cluster, it may be the case that some clusters 302 will have cyclical components. For example, cluster 302-1 has a cycle that includes nodes 304-B, 304-C, 304-G, and 304-E, and edges 306-BG, 306-BC, 306-CE, and 306-EG. Additionally, cluster 302-2 forms a cycle between all nodes 304 within the cluster 302-2. Due to the processes that will be described in further detail below, it is desirable to remove these cycles. To do so, the edge 306 with the lowest weight in a cycle is removed. For example, in cluster 302-1, the edge 306-GE has the lowest weight, and is thus removed. In cluster 302-2, the edge 306-PQ has the lowest weight, and is thus removed. Detecting cycles within a cluster 302 may be done through a variety of cycle detecting functions. FIG. 3B illustrates the graph 300 after the appropriate edges 306 have been removed.

In the present example, the data objects represented by nodes within a cluster are assigned to a relational database storage node. The data objects represented by the stand alone nodes are assigned to a non-relational database storage node. For purposes of discussion, the clusters 302 will be described as being assigned to a virtual bucket. The nodes within a virtual bucket will be assigned to the same relational database storage node.

It is then determined how many nodes 304, based on the sum of the node values, should be placed into each bucket. The number of node values that can be placed into a bucket will be referred to as a bucket threshold value. The bucket threshold value is the sum of all cluster values 308, divided by the number of relational database storage nodes available. In this example, the sum of all cluster values is 82+33+28+11=154. In this example, there are four relational database storage nodes available. Thus, the bucket threshold value is 154/4=39.5. In some examples, a deviation value may be associated with the bucket threshold value. For example, if the deviation value is 1.5, then a bucket is deemed full if the sum of all node values within that bucket is 38-41, in this example.

The process of assigning clusters 302 to buckets starts with the cluster having the highest cluster value. If the cluster value 308 of a particular cluster is larger than the bucket threshold value, then that cluster is split. The process for splitting a cluster will be described in accordance with FIGS. 4A and 4B.

Figure 4A:
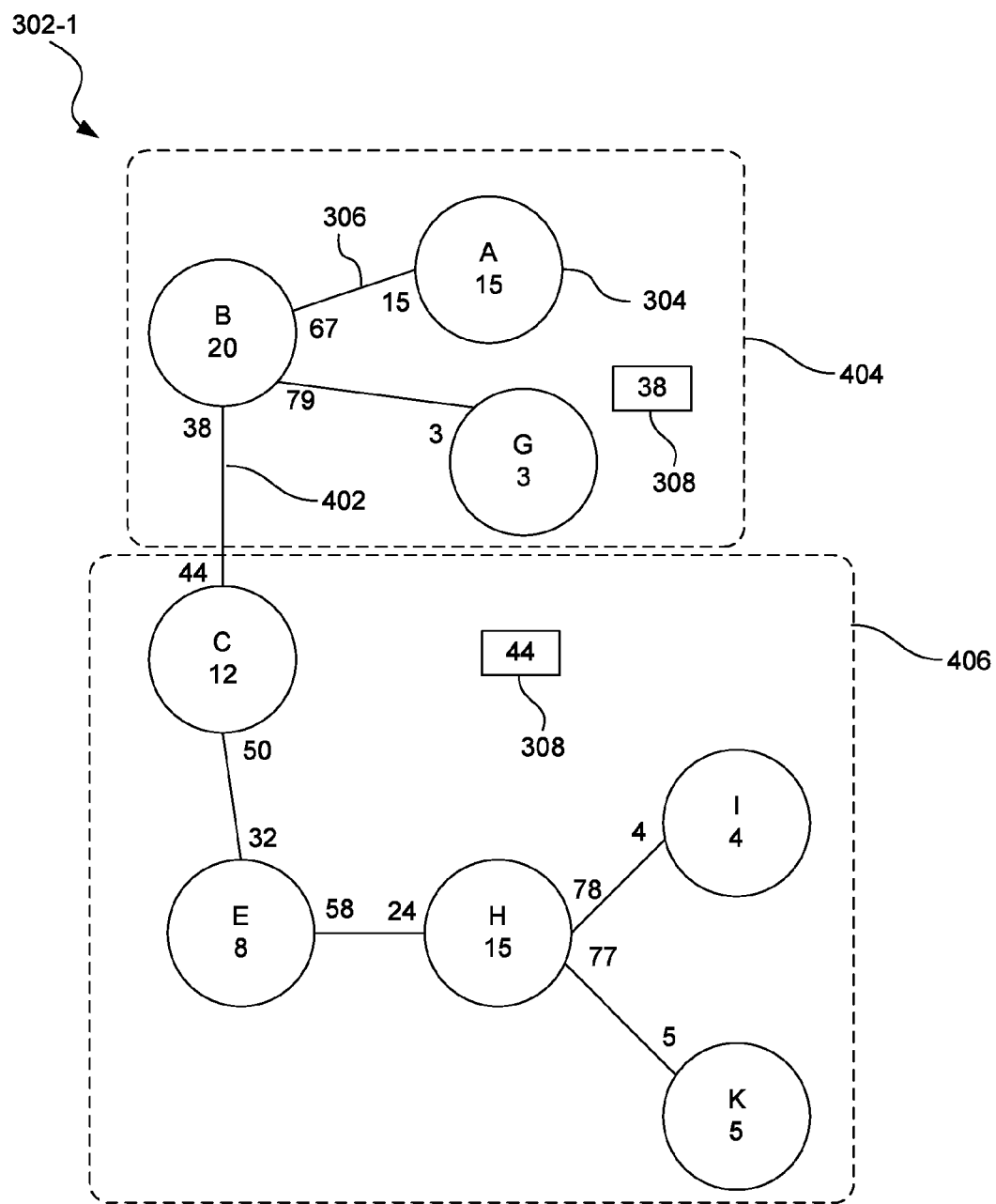
FIGS. 4A and 4B are diagrams showing an illustrative split of clusters of the graph, according to one example of principles described herein.
Figure 4B:
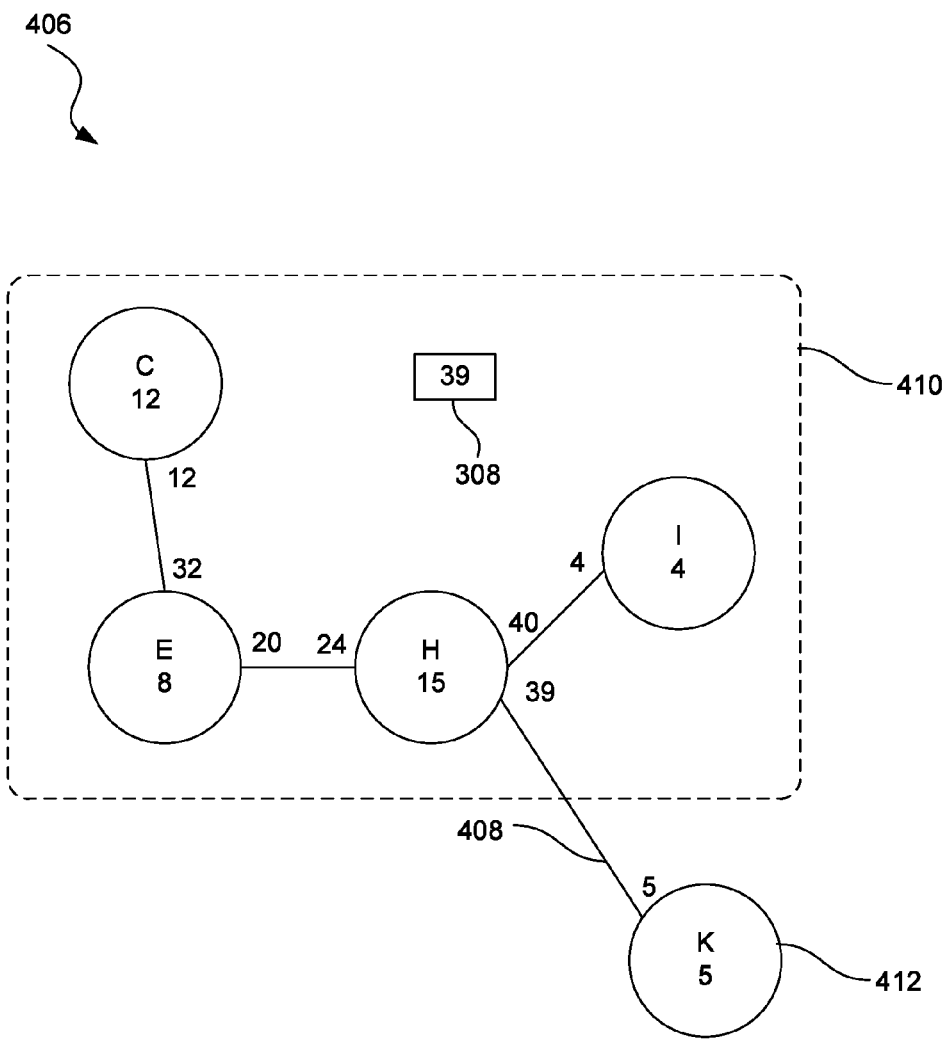

FIGS. 4A and 4B are diagrams showing an illustrative split of clusters of the graph. It is desirable to split a cluster 302 such that one of the remaining clusters is as large as possible without exceeding the bucket threshold value. FIG. 4A represents the splitting of cluster 302-1 into a first remaining cluster 404, and a second remaining cluster 406.

According to the present example, each edge 306 within the cluster 302-1 is assigned a split value on each end. The split value is the sum of all node values accessible from that end of an edge. For example, the edge 402 between nodes B and C has one split value for each end. On the end closest to node B, the split value is 38. This is because from that end, nodes B, A, and G are accessible, and the sum of those node values is 38. The end closest to node C has a split value of 44. This is because from this end, nodes B, G, C, E, H, I, and K can be reached, and the sum of the node values for these nodes is 67.

After obtaining the split values for each node within the cluster, it can be determined which split value comes closest to the bucket threshold value without exceeding the bucket threshold value. In this example, the edge 402 between nodes B and C is removed to split the cluster 302-1 because that edge 402 has a split value of 38. The remaining clusters 404, 406 have cluster values of 38 and 44 respectively. Thus, cluster 404 can be used to fill one of the four buckets. Cluster 406, however, is still too large.

FIG. 4B represents the splitting of cluster 406 into a first remaining cluster 410 and a second remaining cluster 412. Again, split values are determined for each edge within the cluster. In this case, the edge 408 between nodes H and K has a split value of 39. Thus, this edge 408 is removed, resulting in cluster 410, having a cluster value of 39, and cluster 412, including only node K. While cluster 412 includes only node K, it is still referred to as a cluster because the process still treats it as a cluster. Cluster 410 is then used to fill the second bucket.

The remaining clusters include cluster 302-2, cluster 302-3, cluster 302-4, and cluster 412, having respective cluster values of 33, 28, 11, and 5. Cluster 302-2 is placed within the third bucket, but with a cluster value of 33, there is still free space left in the third bucket. Thus, the largest cluster value, without exceeding the bucket threshold value, is placed within the third bucket. In this case, cluster 412 fits within the third bucket. Clusters 302-3 and 302-4 having respective cluster values 28 and 11 are placed within the fourth bucket. The final placement of nodes within bucket is as follows:

Bucket 1: A, B, G,
Bucket 2: H, E, C, I,
Bucket 3: L, P, Q, K,
Bucket 4: T, U, V, W, The data shifting manager 112 can then instruct the node managers 108 to shift the data according to the buckets. For example, the data objects represented by nodes A, B, and G will all be placed on a single relational database storage node 103. For example, the nodes in bucket 1 can be assigned to storage node 102-1, the nodes in bucket 2 can be assigned to storage node 102-2, the nodes in bucket 3 can be assigned to storage node 102-3, and the nodes in bucket 4 can be assigned to storage node 102-4. The remaining data objects represented by the remaining nodes will be placed in the other relational database storage nodes accordingly. When placed as such, this makes it more likely that a future join request from a client 116 will request a join on two data objects stored on the same relational database storage node, thus leading to a more efficient response time. After the node managers have been informed of the new data object assignments as determined from the process described above, the graph 300 may be discarded as it is no longer needed. At the end of the next period, the process may be repeated based on the statistics collected during such period.

Figure 5A:
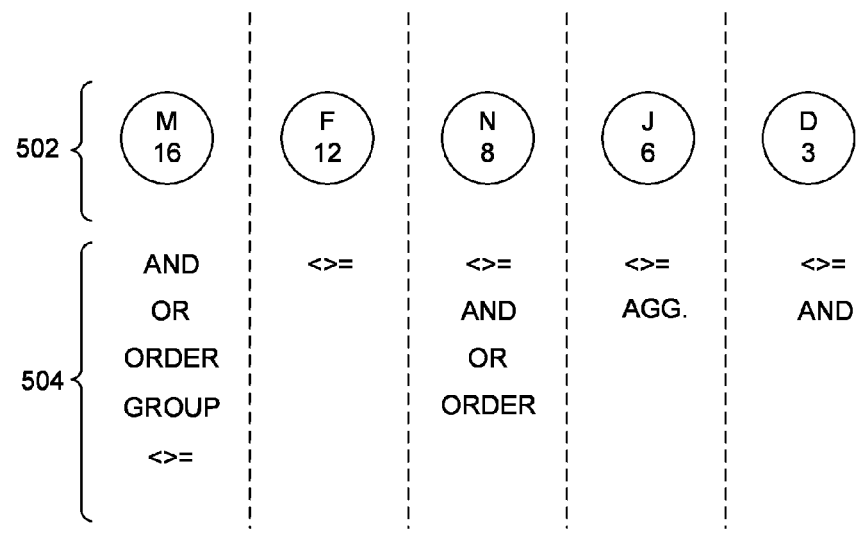
FIGS. 5A and 5B are diagrams showing illustrative node assignment for data objects, according to one example of principles described herein.
Figure 5B:
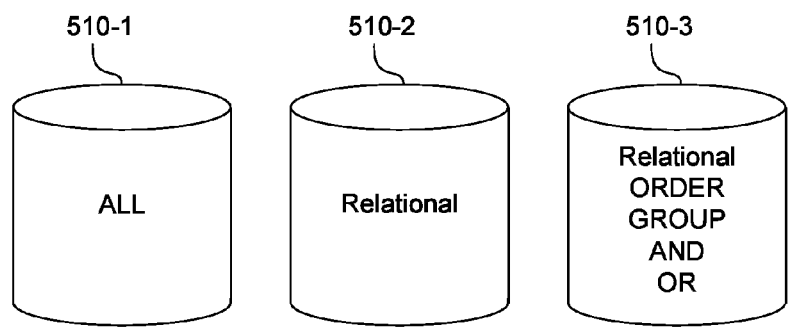

FIGS. 5A and 5B are diagrams showing illustrative node assignment for data objects. According to the present example, the nodes of the graph 300 that were not part of a cluster are assigned to a non-relational database storage node 105. In general, the data objects represented by the nodes are assigned to non-relational databases having the capabilities that correspond to the statistics associated with those data objects.

FIG. 5A illustrates a list of types of operations 504 is associated with each of the nodes 502. Specifically, the data object associated with node M has had an AND operation, an OR operation, an ORDER BY operation, a GROUP BY operation, and a relational operation performed on the data object. This means that a client device 116 has requested such operations on the data object associated with node M. Node F is associated with a relational operation. Node N is associated with a relational operation, an AND operation, an OR operation, and an ORDER BY operation. Node J is associated with a relational operation, and an AGGREGATE operation. Node D is associated with a relational operation and an AND operation.

FIG. 5B illustrates three non-relational database storage nodes, and the capabilities of those nodes. Specifically, storage node 510-1 has the capability to perform all types of operations. Storage node 510-2 has the capability of performing relational operations only. Storage node 510-3 is capable of performing relational operations, ORDER BY operations, GROUP BY operations, AND operations, and OR operations.

The nodes 502 will be assigned to a non-relational database storage node 510 based on the node values, the statistics of operations 504 performed on the data objects represented by the nodes, and the capabilities of the non-relational database storage nodes 510. According to the present example, the nodes 502 are ordered from the highest node value to the lowest node value. Starting with the node 502 having the highest node value, node M, the following process is performed. A temporary set of relational database storage nodes having the required capabilities is determined. In this case, non-relational database storage nodes 510-1 and 510-3 are capable of supporting the data object represented by node M. The node will then be assigned to the non-relational database storage node 510 having the smallest sum of node values already assigned thereto. In this case, no nodes have yet been assigned, so node M can be assigned to either storage node 510-1 or 510-3. In some examples, if a node can be assigned to more than one storage node, then the storage node having fewer capabilities can be selected, in this case, node 510-3. Continuing this process, node F will be placed in storage node 510-2. Nodes N, J, and D will be placed into storage node 510-1.

In some cases, no storage node 510 may be capable of performing one or more operations 504 associated with a particular node 504. In such case, a random selection of a type of operation not supported by any storage node 510 is removed, and the process continues until each of the nodes has been assigned to a non-relational database storage node. The data shifting manager will then instruct the node managers to shift the data accordingly. Shifting data in such a manner makes it more likely that a requested operation can be performed by the storage node itself and not have to be performed by a node manager 108. This allows for a quicker and more efficient response.

Figure 6:
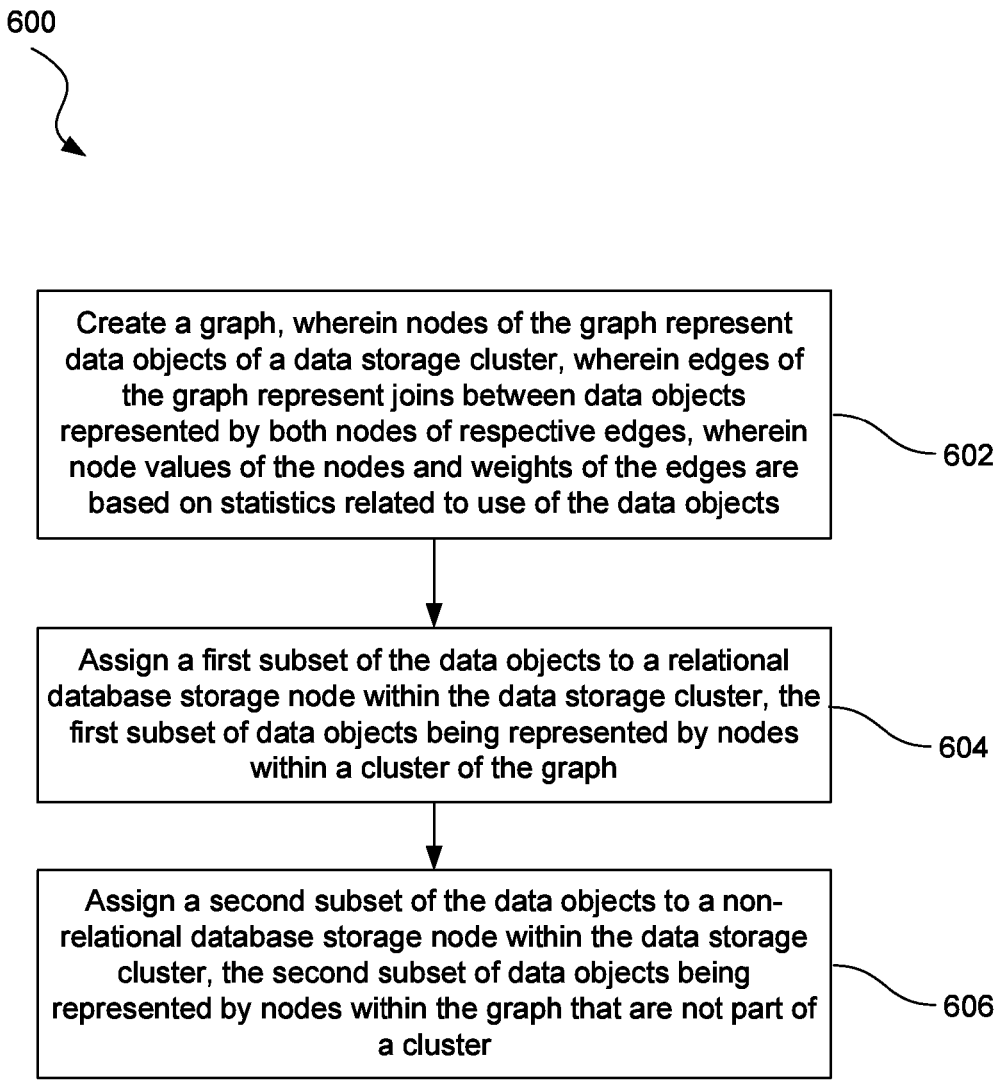
FIG. 6 is a flowchart showing an illustrative method for data shifting within a hybrid data storage cluster, according to one example of principles described herein.

FIG. 6 is a flowchart showing an illustrative method for data shifting within a hybrid data storage cluster. According to the present example, the method 600 includes a step 602 for creating a graph, such as graph 300. Nodes of the graph represent data objects of a data storage cluster. Edges of the graph represent joins between data objects represented by both nodes of respective edges. Node values of the nodes and weights of the edges are based on statistics related to use of the data objects. For example, the node values and edge weights may represent the statistics as described above in the text accompanying FIG. 3.

According to the present example, the method 600 further includes a step 604 for assigning a first subset of the data objects to a relational database storage node within the data storage cluster, the first subset of data objects being represented by nodes within a cluster of the graph. For example, this may be done using the process described above in the text accompanying FIGS. 3, 4A, and 4B.

According to the present example, the method 600 includes a step 606 for assigning a second subset of the data objects to a non-relational database storage node within the data storage cluster, the second subset of data objects being represented by nodes within the graph that are not part of a cluster. For example, this may be done using the process described above in the text accompanying FIGS. 5A and 5B.

Figure 7:
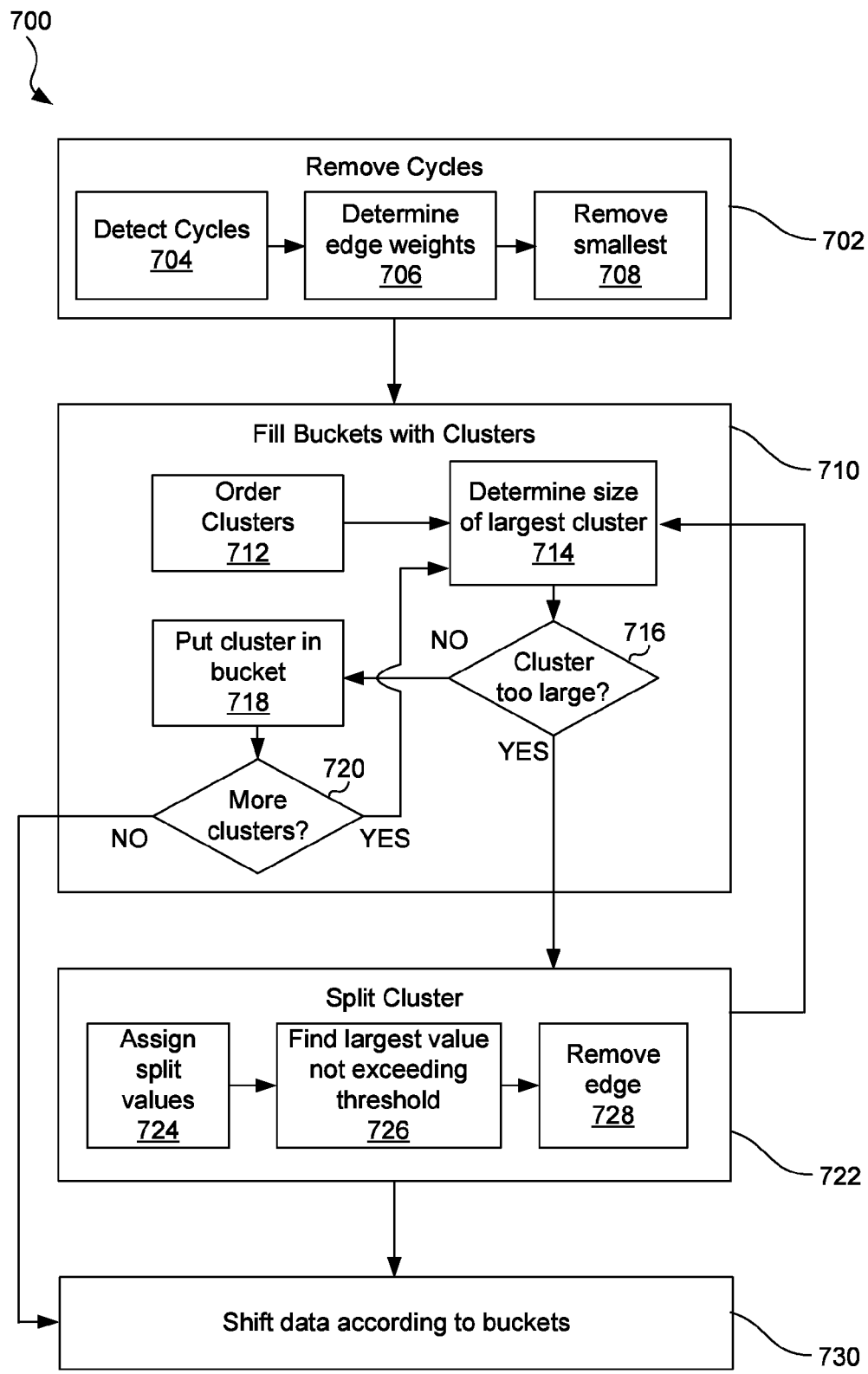
FIG. 7 is a flowchart showing an illustrative method for data shifting to relational database storage nodes, according to one example of principles described herein.

FIG. 7 is a flowchart showing an illustrative method 700 for data shifting to relational database storage nodes. Specifically, the method 700 describes data shifting for data objects that are represented by nodes in the graph that belong to a cluster. For example, the method 700 may be part of step 604 described above.

According to the present example, the method 700 includes a step 702 for removing cycles within the clusters of the graph. This step 702 includes a step 704 for detecting cycles. Detecting cycles may be done through various functions that are used to detect cycles within a graph. At step 706, the edge weights for each of the edges within a cycle are determined. Then, at step 708, the edge having the lowest weight is removed. These steps are performed for each of the cycles found within any of the clusters of the graph.

The method 700 further includes a step 710 for filling virtual buckets with the clusters. At step 712, the clusters are ordered from largest to smallest. Then, at step 714, the size of the largest cluster is determined. At step 716, it is determined whether that cluster is too large to fit into a virtual bucket. A cluster is too large if the cluster value for that cluster is larger than the bucket threshold value. If the cluster is not too large, meaning that the cluster value is less than the bucket threshold value, then that cluster is put into a bucket at step 718.

At step 720, it is determined whether there are any more clusters that should be put into buckets. If there are no more clusters, then at step 730, data is shifted according to the nodes that are within each bucket. Specifically, the data objects associated with the nodes for a particular bucket are moved to a data storage node associated with that particular bucket. If, however, there are more clusters to be assigned to buckets, the method returns to step 714.

If at step 716, it is determined that a cluster is too large (i.e., the cluster value for that cluster is larger than the bucket threshold value), then the method proceeds to step 722 to split that cluster. At step 724, each edge is assigned two split values as described above. Then, at step 726, the split value having the highest value without exceeding the bucket threshold value is found. The edge associated with that found split value is then removed at step 728. After the cluster has been split, the remaining clusters can be put back into the pool of clusters in order of size. Then, the method returns to step 714.

Figure 8:
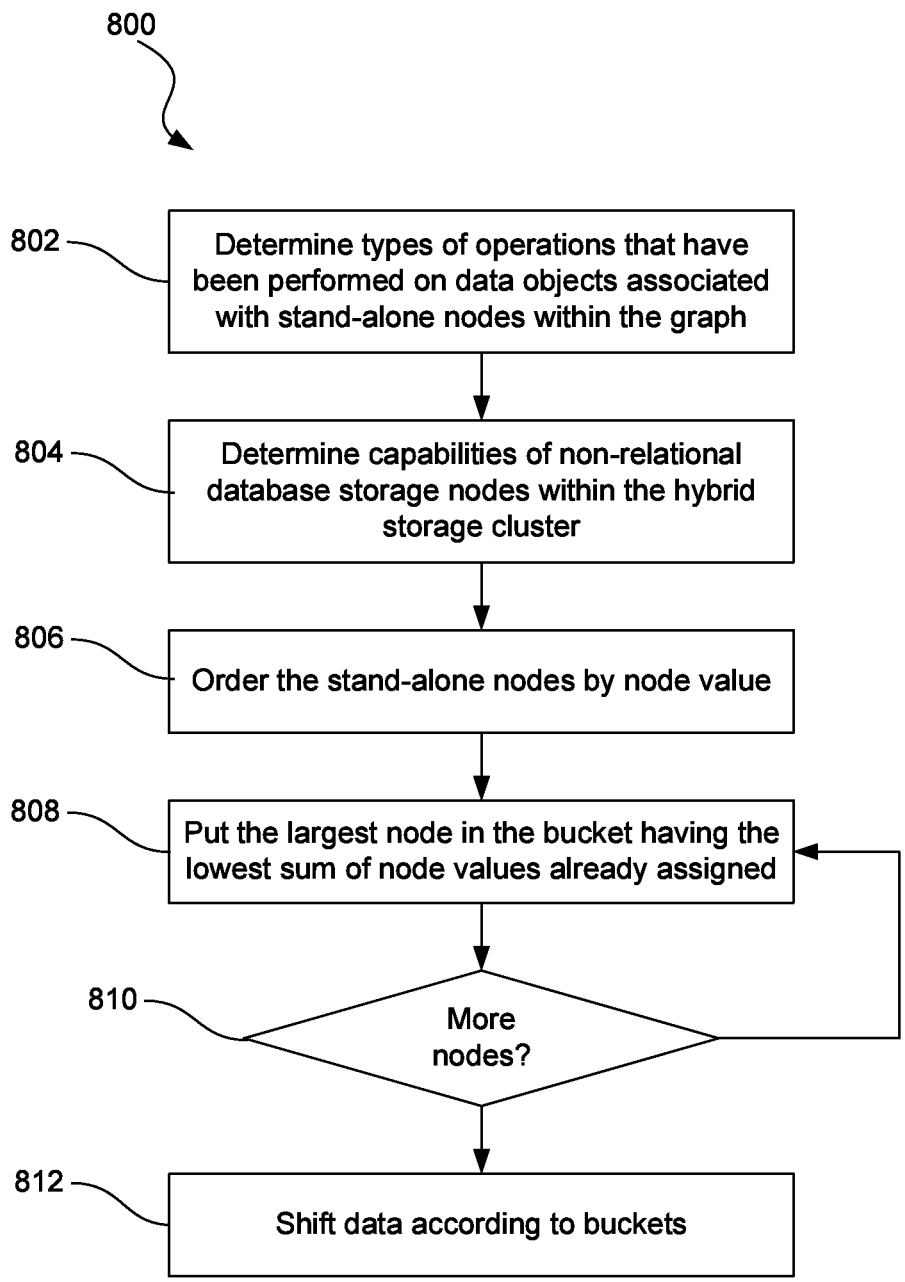
FIG. 8 is a flowchart showing an illustrative method for data shifting to non-relational database storage nodes, according to one example of principles described herein.

FIG. 8 is a flowchart showing an illustrative method for data shifting to non-relational database storage nodes. Specifically, the method 800 relates to assigning data objects represented by stand-alone nodes within the graph. The method 800 may be part of step 606 described above.

According to the present example, the method 800 includes a step 802 for determining the types of operations that have been performed on data objects associated with stand-alone nodes within the graph. As described above, these operations may include AND operations, OR operations, relational operations, ORDER BY operations, GROUP BY operations, and AGGREGATE operations. At step 804 the capabilities of the non-relational database storage nodes within the hybrid storage cluster are determined. For example, some non-relational database storage nodes may be capable of performing AND and OR operations, but may not be capable of performing ORDER BY operations.

At step 806, the stand-alone nodes are ordered by node value. At step 808, the largest node is put into a bucket that corresponds to a non-relational database storage node that has the capabilities of handling the operations associated with the data object assigned to that node. For example, a subset of the non-relational database nodes having the proper capabilities may be determined. Then, the node may be assigned to the bucket corresponding to that subset, the assigned bucket having the lowest sum of node values already assigned. If no non-relational node supports all of the capabilities associated with a data object represented by a stand-alone node, then a capability associated with the stand-alone node can be removed, and then the node may be assigned to a bucket as described above. The capability that is removed may be selected at random. Or, the capability having the statistically least amount of use may be removed.

At step 810, it is determined whether there are any more nodes that should be placed into buckets. If so, then the method returns to step 808. But, if not, then the method proceeds to step 812, wherein the data is shifted according to buckets. Specifically, all the data objects associated with the nodes in a particular bucket are moved to the non-relational database storage node associated with that particular bucket.

Some examples of processing systems described herein may include non-transitory, tangible, machine readable media that include executable code that when run by one or more processors (e.g., processor 202) may cause the one or more processors to perform the processes of method 600 as described above. Some common forms of machine readable media that may include the processes of methods 600, 700, and 800 for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method performed by a computing system, the method comprising:
    shifting data between nodes in a data storage cluster, wherein the shifting is done by;
        creating a graph, wherein nodes of the graph represent data objects of the data storage cluster, wherein edges of the graph represent joins between data objects represented by both nodes of respective edges, wherein node values of the nodes and weights of the edges are based on statistics related to use of the data objects;
        assigning a first subset of the data objects to a relational database storage node within the data storage cluster, the first subset of data objects being represented by nodes within a cluster of the graph;
        assigning a second subset of the data objects to a non-relational database storage node within the data storage cluster, the second subset of data objects being represented by stand-alone nodes within the graph;
        assigning a cluster value to each cluster in the graph, the cluster value being the sum of all node values within the respective cluster;
        determining a bucket threshold value, the bucket threshold value being the sum of the cluster values of each cluster within the graph divided by a number of relational database storage nodes within the data storage cluster; and
        splitting clusters that have a cluster value that is larger than the bucket threshold value, wherein a cluster is split such that a cluster value of a resulting cluster is as close to the bucket threshold value as possible without exceeding the bucket threshold value.

2. The method of claim 1, wherein the node values of the nodes are based on a number of times a table associated with the respective node has been accessed, and wherein the weights of the edges are based on a number of times a join operation has been requested for two data objects associated with two nodes connected to the respective edge.

3. The method of claim 2, wherein the node values are weighted according to a size of the data object represented by the respective node.

4. The method of claim 2, further comprising, removing a cyclical portion from the graph by removing an edge within the cyclical portion, the edge being removed having a lowest weight within the cyclical portion.

5. The method of claim 2, further comprising, assigning clusters to relational database storage nodes in an order from largest cluster to smallest cluster until all clusters have been assigned to a relational database.

6. The method of claim 5, further comprising, shifting data within the data storage cluster according to the assigning clusters to relational database storage nodes.

7. The method of claim 1, further comprising, determining types of operations that have been performed on data objects associated with nodes within the graph that are not part of a cluster.

8. The method of claim 7, further comprising, assigning the data objects associated with the stand-alone nodes of the graph based on the types of operations that have been performed on the data objects and capabilities of the non-relational database storage nodes of the data storage cluster.

9. The method of claim 7, wherein the types of operations include at least one of: AND operations, OR operations, relational operations, ORDER BY operations, GROUP BY operations, and AGGREGATE operations.

10. A computing system comprising:
a processor; and
a memory comprising machine readable instructions that when executed by the processor, cause the system to shift data between nodes in a data storage cluster, wherein to shift data, the processor causes the system to:
create a graph, wherein nodes of the graph represent data objects of the data storage cluster, wherein edges of the graph represent joins between data objects associated with both nodes of respective edges, wherein values of the nodes and weights of the edges are based on statistics related to use of the data objects of the data storage cluster;
assign a first subset of the data objects to a relational database storage node within the data storage cluster, the first subset of data objects being represented by nodes within a cluster of the graph;
assign a second subset of the data objects to a non-relational database storage node within the data storage cluster, the second subset of data objects being represented by stand-alone nodes within the graph;
assign a cluster value to each cluster in the graph, the cluster value being the sum of all node values within the respective cluster;
determine a bucket threshold value, the bucket threshold value being the sum of the cluster values of each cluster within the graph divided by a number of relational database storage nodes within the data storage cluster; and
split clusters that have a cluster value that is larger than the bucket threshold value, wherein a cluster is split such that a cluster value of a resulting cluster is as close to the bucket threshold value as possible without exceeding the bucket threshold value;
wherein the node values of the nodes are based on a number of times a table associated with the respective node has been accessed, and wherein the weights of the edges are based on a number of times a join operation has been requested for two data objects associated with two nodes connected to the respective edge.

11. The system of claim 10, wherein the processor is to further cause the system to:
determine types of operations that have been performed on data objects associated with stand-alone nodes within the graph; and
assign the data objects associated with the stand-alone nodes of the graph based on the types of operations that have been performed on the data objects and capabilities of the non-relational database storage nodes of the data storage cluster.

12. The system of claim 11, wherein the types of operations include at least one of: AND operations, OR operations, relational operations, ORDER BY operations, GROUP BY operations, and AGGREGATE operations.

13. A method performed by a computing system, the method comprising:
collecting statistics related to a number of times data objects within a hybrid data storage cluster have been accessed and how many times join operations have been applied to the data objects;
shifting data between nodes in a data storage cluster, wherein the shifting is done by:
creating a graph, wherein nodes of the graph represent data objects of the hybrid data storage cluster, wherein edges of the graph represent joins between data objects associated with both nodes of respective edges, wherein values of the nodes and weights of the edges are based on statistics related to use of the data objects of the hybrid data storage cluster;
assigning a first subset of the data objects to a relational database storage node within the data storage cluster, the first subset of data objects being represented by nodes within a cluster of the graph;
assigning a second subset of the data objects to a non-relational database storage node within the data storage cluster, the second subset of data objects being represented by stand-alone nodes within the graph;
assigning a cluster value to each cluster in the graph, the cluster value being the sum of all node values within the respective cluster; and
determining a bucket threshold value, the bucket threshold value being the sum of the cluster values of each cluster within the graph divided by a number of relational database storage nodes within the data storage cluster; and
splitting clusters that have a cluster value that is larger than the bucket threshold value, wherein a cluster is split such that a cluster value of a resulting cluster is as close to the bucket threshold value as possible without exceeding the bucket threshold value.

14. The method of claim 13, wherein the node values of the nodes are based on a number of times a table associated with the respective node has been accessed, and wherein the weights of the edges are based on a number of times a join operation has been requested for two data objects associated with two nodes connected to the respective edge.

15. The method of claim 14, further comprising, removing a cyclical portion from the graph by removing an edge within the cyclical portion, the edge being removed having a lowest weight within the cyclical portion.

16. The method of claim 14, further comprising:
assigning clusters to relational database storage nodes in an order from largest cluster to smallest cluster until all clusters have been assigned to a relational database storage node; and
shifting data within the data storage cluster according to cluster assignments.

17. The method of claim 13, further comprising, assigning the data objects associated with the stand-alone nodes of the graph based on the types of operations that have been performed on the data objects and capabilities of the non-relational database storage nodes of the data storage cluster.

18. The method of claim 17, wherein the types of operations include at least one of: AND operations, OR operations, relational operations, ORDER BY operations, GROUP BY operations, and AGGREGATE operations.

* * * * *